United States Patent [19]

Birkelbach

[11] 4,189,553
[45] Feb. 19, 1980

[54] HIGH EFFICIENCY CATALYST FOR POLYMERIZING OLEFINS

[75] Inventor: Donald F. Birkelbach, Angleton, Tex.

[73] Assignee: The Dow Chemical Company, Midland, Mich.

[21] Appl. No.: 911,741

[22] Filed: Jun. 2, 1978

Related U.S. Application Data

[62] Division of Ser. No. 746,354, Dec. 1, 1976.

[51] Int. Cl.$^2$ .............................................. C08F 4/52
[52] U.S. Cl. ............................. 526/92; 252/429 B; 252/429 C; 252/431 R; 252/431 N; 252/431 P; 526/128; 526/137; 526/139; 526/141; 526/142; 526/144; 526/151; 526/153; 526/348.2
[58] Field of Search ............... 526/92, 128, 137, 161, 526/163, 166, 185, 187, 139, 141, 142, 144, 151, 153

[56] References Cited

U.S. PATENT DOCUMENTS

| | | | |
|---|---|---|---|
| 3,530,107 | 9/1970 | Yoshioka et al. | 252/429 B |
| 3,649,709 | 3/1972 | Medemact et al. | 252/429 B |
| 3,663,450 | 5/1972 | Cozewith et al. | 252/429 B |
| 3,843,619 | 10/1974 | Calcagno et al. | 252/429 B |
| 3,984,350 | 10/1976 | Karayannis et al. | 252/429 B |
| 3,989,878 | 11/1976 | Aishima et al. | 252/429 B |
| 4,004,071 | 1/1977 | Aishima et al. | 252/429 C |
| 4,027,089 | 5/1977 | Aishima et al. | 252/429 B |

*Primary Examiner*—Stanford M. Levin
*Attorney, Agent, or Firm*—J. G. Carter; M. S. Jenkins

[57] ABSTRACT

Compositions exhibiting high catalytic activity in the polymerization of α-olefins, particularly higher olefins, are provided by reacting a trivalent titanium halide complex such as an alcohol complex of titanium trichloride, an organomagnesium component such as a hydrocarbon soluble complex of dialkyl magnesium and an alkyl aluminum and halide source such as a hydrogen halide or an alkyl aluminum halide. Polymerization processes employing this catalyst composition do not require conventional catalyst removal steps in order to provide polymers having suitable color and other physical characteristics.

8 Claims, No Drawings

HIGH EFFICIENCY CATALYST FOR POLYMERIZING OLEFINS

CROSS REFERENCE TO RELATED APPLICATION

This is a divisional, of application Ser. No. 746,354, filed Dec. 1, 1976.

BACKGROUND OF THE INVENTION

This invention relates to a new catalyst composition useful for initiating and promoting polymerization of α-olefins and to a polymerization process employing such a catalyst composition.

It is well known that olefins such as ethylene, propylene, and 1-butene in the presence of metallic catalysts, particularly the reaction products of organometallic compounds and transition metal compounds can be polymerized to form substantially unbranched polymers of relatively high molecular weight. Typically such polymerizations are carried out at relatively low temperatures and pressures.

Among the methods for producing such linear olefin polymers, some of the most widely utilized are those described by Professor Karl Ziegler in U.S. Pat. Nos. 3,113,115 and 3,257,332. In these methods, the catalyst employed is obtained by admixing a compounds of a transition metal of Groups 4b, 5b, 6b and 8 of Mendeleev's Periodic Table of Elements with an organometallic compound. Generally, the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, polymerization is carried out in a reaction medium comprising an inert organic liquid, e.g., an aliphatic hydrocarbon and the aforementioned catalyst. One or more olefins may be brought into contact with the reaction medium in any suitable manner. A molecular weight regulator, which is normally hydrogen, is usually present in the reaction vessel in order to suppress the formation of undesirably high molecular weight polymers.

Following polymerization, it is common to remove catalyst residues from the polymer by repeatedly treating the polymer with alcohol or other deactivating agent such as aqueous base. Such catalyst deactivation and/or removal procedures are expensive both in time and material consumed as well as the equipment required to carry out such treatment.

Furthermore, most of the aforementioned known catalyst systems are more efficient in preparing polyolefins in slurry (i.e., wherein the polymer is not dissolved in the carrier) than in solution (i.e., wherein the temperature is high enough to solubilize the polymer in the carrier). The lower efficiencies of such catalysts in solution polymerization is generally believed to be caused by the general tendency of such catalysts to become rapidly depleted or deactivated by significantly higher temperatures that are normally employed in solution processes. In addition, processes involving the copolymerization ethylene with highly α-olefins exhibit catalyst efficiencies significantly lower than ethylene homopolymerization processes.

Recently, catalysts having higher efficiencies have been disclosed, e.g., U.S. Pat. Nos. 3,392,159, 3,737,393, West German Patent Application 2,231,982 (U.S. Pat. No. 3,878,124) and British Pat. Nos. 1,305,610 and 1,358,437. While the increased efficienceis achieved by using these recent catalysts are significant, even higher efficiencies are desirable particularly in copolymerization processes.

In view of the foregoing problems encountered in the use of conventional Ziegler catalysts, it would be highly desirable to provide a polymerization catalyst that is sufficiently active, even at solution polymerization temperature above 140° C., to produce such high quantities of olefin homopolymers or copolymers per unit of catalyst that is no longer necessary to remove catalyst residue in order to obtain a polymer of the desired purity.

SUMMARY OF THE INVENTION

The present invention, in one aspect, is the catalytic reaction product of (A) a complex of a trivalent titanium compound with an electron donor, (B) an organomagnesium component and (C) a halide source. The magnesium component is (1) a complex of an organomagnesium compound and an organometallic compound which solubilizes the organomagnesium compound in hydrocarbon or (2) an organomagnesium compound. The halide source is a non-metallic halide corresponding to the formula R'X wherein R' is hydrogen or an active monovalent organic radical and X is halogen. Alternatively, the halide source is a metallic halide corresponding to the formula $MR_{y-a}X_a$ wherein M is a metal of Group 3a or 4a of Mendeleev's Periodic Table of the Elements, R is a monovalent organic radical usually hydrocarbyl or hydrocarbyloxy, X is halogen, y is a number corresponding to valence of M and a is a number from 1 to y. The proportions of the foregoing components of said catalytic reaction products are such that the atomic ratio of Mg:Ti is from about 1:1 to about 2000:1, the atomic ratio of Al:Ti is within the range from about 0.1:1 to about 2000:1, the atomic ratio of Mg:X is within the range from about 0.01:1 to about 1:1.

In a second aspect, the invention is a process for polymerizing at least one α-olefin under conditions characteristic of Ziegler polymerization wherein the aforementioned reaction product is preferably employed as the sole catalyst.

In view of the reduced activity of conventional Ziegler catalysts in the copolymerization of α-olefins, particularly at solution polymerization temperatures, it is indeed surprising that the aforementioned catalytic reaction product is a high efficiency catalyst capable of producing more than a million pounds of olefin copolymer per pound of transition metal under such polymerization conditions. Accordingly, olefin polymers produced in accordance with the foregoing process generally contain lower amounts of catalyst residues than polymers produced in the presence of conventional catalyst even after subjecting such conventionally produced polymers to catalyst removal treatments. Further, these catalytic reaction products enable a higher degree of control over the polymerization in order that a more uniform product can be made.

DETAILED DESCRIPTION OF THE PREFERRED EMBODIMENTS

The present invention is most advantageously practiced in a polymerization process wherein an α-olefin is polymerized, generally in the presence of hydrogen as a molecular weight control agent, in a polymerization zone containing an inert diluent and the reaction product as hereinbefore described. Especially advantageous is the copolymerization of ethylene with higher α-olefins using the catalytic reaction product of this invention. The foregoing polymerization process is most beneficially carried out under inert atmosphere and relatively low temperature and pressure, although very high pressures are optionally employed.

Olefins which are suitably homopolymerized or copolymerized in the practice of this invention are generally the aliphatic α-monoolefins or α-diolefins having from 2 to 18 carbon atoms. Illustratively, such α-olefins can include ethylene, propylene, butene-1, pentene-1, 3-methylbutene-1, hexene-1, octene-1, dodecene-1, octadecene-1, 1,7-octadiene and the like. It is understood that α-olefins may be copolymerized with other α-olefins and/or with small amounts i.e., up to about 25 weight percent based on the polymer, of other ethylenically unsaturated monomers such as styrene α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 50, especially from about 0.5 to about 40, weight percent of propylene, butene-1, 1,7-octadiene or similar higher α-olefin based on total monomer.

Advantageously, the trivalent titanium complex is represented by the empirical formula: $TiZ_3(L)_x$ wherein Z is halide, and L is an electron donating compound such as water or an organic electron donor, e.g., alcohol, ether, ketone, amine, or olefin, and x is a whole number from 1 to 6. Usually, the organic electron donor has from 1 to 12 carbon atoms and donates an unshared pair of electrons to the complex. In preferred complexes, Z is chloride or bromide, most preferably chloride and L is alcohol, especially an aliphatic alcohol having 2 to 8 carbon atoms and most preferably 3 to 6 carbon atoms such as isopropyl alcohol, n-propyl alcohol, n-butyl alcohol and isobutyl alcohol. While the exact structure of the complex is not known, it is believed to contain 3 valence bonds to the halide ions and 1 to 6, preferably 2 to 4 coordination bonds to the electron donating compound. The titanium halide complex is most advantageously prepared by heating the trivalent titanium halide dispersed in the electron donating compound under nitrogen or similar inert atmosphere. Usually the formation of the complex is visually indicated by a definite change in color. For example, when the dark purple α-$TiCl_3$ is heated in anhydrous isopropyl alcohol under nitrogen, complex formation is indicated by the formation of a brilliant blue solution. In preferred complexes, the complex is normally solid.

In addition to a α-$TiCl_3$, the Δ, γ and β crystalline forms of titanium trichloride are advantageously employed in the preparation of the complex. Also suitable are titanium tribromide, titanium fluoride and the like. Of the foregoing, the γ- and α- forms of titanium trichloride are preferred. Exemplary electron donating compounds suitably employed include aliphatic alcohols, e.g., isopropyl alcohol, ethanol, n-propyl alcohol, butanol and others having from 1 to 10 carbon atoms; ethers, ketones; aldehydes; amines; olefins, and the like having from 1 to 20 carbon atoms; water.

The preferred organomagnesium component is a hydrocarbon soluble complex illustrated by the formula $MgR''_2 \cdot xMR''_y$ wherein R'' is hydrocarbyl, M is aluminum, zinc or mixtures thereof and x is about 0.001 to 10, especially from about 0.15 to about 2.5 and y denotes the number of hydrocarbyl groups which corresponds to the valence of M. As used herein, hydrocarbyl is a monovalent hydrocarbon radical. Preferably, hydrocarbyl is alkyl, cycloalkyl, aryl, aralkyl, alkenyl and similar hydrocarbon radicals having 1 to 8 carbon atoms, with alkyl having 1 to 4 carbon atoms being especially preferred. This complex is prepared by reacting particulate magnesium such as magnesium turnings, or magnesium particles with about a stoichiometric amount of hydrocarbyl halide, illustrated as R''X. The resulting hydrocarbon insoluble $MgR''_2$ is solubilized by adding the organometallic compound such as $AlR''_3$ or mixtures thereof with $ZnR''_2$. The amount of organometallic compounds which is added to the $MgR''_2$ to form the organomagnesium complex should be enough to solubilize a significant amount of $MgR''_2$, e.g., at least 5 weight percent of $MgR''_2$ is solubilized. It is preferred to solubilize at least 50 weight percent of the $MgR''_2$ and especially preferred to solubilize all of $MgR''_2$. When employing a mixture of $AlR''_3$ and $ZnR''_2$ to solubilize $MgR''_2$, the atomic ratio of Zn to Al is from about 3000:1 to about 0.1:1, preferably from about 350:1 to about 1:1. In order to obtain maximum catalyst efficiency at polymerization temperatures above 180° C., it is desirable to minimize the amount of aluminum in the complex as well as in the total catalyst. Accordingly, for catalysts having Al:Ti atomic ratios less than 120:1, it is desirable to have a Mg:Al atomic ratio more than 0.3:1, preferably from about 0.5:1 to 10:1. In suitable complexes, organometallic compounds (other than $AlR''_3$, $ZnR''_2$ or mixtures thereof) which also solubilize the organomagnesium compound in hydrocarbon are employed in beneficial amounts, usually an amount sufficient to produce an atomic ratio of 0.01:1 to 10:1 of metal of the organometallic compounds to magnesium. Examples of such other organometallic compounds include boron trialkyls such as boron triethyl, alkyl silanes such as dimethyl silane and tetraethyl silane, alkyl tin and alkyl phosphorous compounds.

Alternative to the aforementioned solubilized magnesium complexes, it is also advantageous to employ organomagnesium compounds as the organomagnesium component. Such compounds, although often insoluble in hydrocarbon, are suitably employed. These compounds can be rendered soluble in hydrocarbon by addition of ether, amine, etc., although such solubilizing agents often reduce the activity of the catalyst. Recently, such compounds have been made hydrocarbon soluble without using such catalyst poisons, e.g., as taught in U.S. Pat. No. 3,646,231. The more recent hydrocarbon solubilized organomagnesium compounds are the most desirable if an organomagnesium compound is to be used as the organomagnesium component.

Preferably the organomagnesium compounds is dihydrocarbylmagnesium such as the magnesium dialkyls and the magnesium diaryls. Exemplary suitable magnesium dialkyls include dibutylmagnesium particularly di-n-butyl magnesium and n-butyl sec-butyl magnesium, dipropylmagnesium, diethylmagnesium, dihexylmagnesium, propylbutylmagnesium and others wherein alkyl has from 1 to 20 carbon atoms. Exemplary suitable magnesium diaryls include diphenylmagnesium, dibenzylmagnesium, and ditolylmagnesium, with the dialkylmagnesiums such as dibutylmagnesium, being expecially preferred. Suitable organomagnesium compounds include alkyl and aryl magnesium alkoxides and aryloxides and aryl and alkyl magnesium halides with the halogen-free organomagnesium compounds being more desirable.

The preferred halide sources are the active non-metallic halides of the formula set forth hereinbefore including hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e., as easily lost to another compound, as the halogen of sec-butyl chloride preferably as active as t-butyl chloride. In addition to the organic monohalides, it is understood that organic dihalides, trihalides and other polyhalides that are active as defined hereinbefore are also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, α-phenylethyl bromide, diphenyl methyl chloride and the like. Most preferred are hydrogen chloride, t-butyl chloride, allyl chloride, and benzyl chloride.

Suitable metallic halides as set forth by formula hereinbefore are organometallic halides and metal halides wherein the metal is in Group 3a, or 4a, of Mendeleev's Periodic Table of Elements. Preferred metallic halides are aluminum halides of the formula $AlR_{3-a}X_a$ wherein R is hydrocarbyl such as alkyl, X is halogen and a is a number from 1 to 3. More preferred are alkylaluminum halides such as ethylaluminum sesquichloride, diethylaluminum chloride, ethylaluminum dichloride, and diethylaluminum bromide, with ethylaluminum dichloride being especially preferred. Alternatively, a metal halide such as aluminum trichloride or a combination of aluminum trichloride with an alkyl aluminum halide or a trialkyl aluminum compound may be suitably employed.

It is understood that the organic moieties of the aforementioned organomagnesium, e.g., R'', and the organic moieties of the halide source, e.g., R and R', are suitably any other organic radical provided that they do not contain functional groups that poison conventional Ziegler catalysts. Preferably such organic moieties do not contain active hydrogen, i.e., those sufficiently active to react with the Zerewitinoff reagent.

In order to maximize catalyst efficiency, the catalyst is prepared by mixing the components of the catalyst in an inert liquid diluent in the following especially preferred order: organomagnesium, titanium complex, and halide source. Somewhat less preferred is the order of addition wherein the organomagnesium component is first added to an inert liquid diluent followed by the addition of the halide source and then the titanium complex. Suitable, but least preferred, is the order of addition wherein (1) the halide source is first combined with the titanium complex and then with the organomagnesium or (2) all three components are added and mixed simultaneously. The foregoing catalyst components are combined in proportions sufficient to provide an atomic ratio of Mg:Ti in the range from about 1:1 to about 1000:1, preferably from about 10:1 to about 100:1, most preferably from about 20:1 to about 80:1; an atomic ratio of Mg:X in the range from about 0.1:1 to about 1:1, preferably from about 0.2:1 to about 0.7:1, most preferably from about 0.4:1 to about 0.6:1.

In cases wherein neither the organomagnesium component nor the halide source contains aluminum, it is desirable to include in the total catalyst an aluminum compound such as an alkyl aluminum compound, e.g., a trialkyl aluminum, an alkyl aluminum halide or an aluminum halide. If polymerization temperatures below 180° C. are employed, the atomic ratio of Al:Ti may be from about 0.1:1 to about 2000:1, preferably from 1:1 to 200:1. However when polymerization temperatures above 180° C. are employed, the aluminum compound is used in proportions such that the Mg:Al ratio is more than 0.3:1, preferably from 0.5:1 to 10:1, and Al:Ti ratio is less than 120:1, preferably less than 75:1. It is understood, however, that the use of very low amounts of aluminum necessitates the use of high purity solvents or diluents in the polymerization zone. Further, other components present in the zone should be essentially free of impurities which react with aluminum alkyls. Otherwise additional organo aluminum must be used to react with such impurities. Moreover, it is understood that in the catalyst the aluminum compound should be in the form of trialkyl aluminum or alkyl aluminum halide provided that the alkyl aluminum halide be substantially free of alkyl aluminum dihalide.

The foregoing catalytic reaction products are preferably carried out in the presence of an inert diluent. The concentrations of catalyst components are preferably such that when the three essential components of the catalytic reaction product are combined, the resultant slurry is from about 0.005 to about 0.1 molar (moles/liter) with respect to magnesium. By way of an example of suitable inert organic diluents can be mentioned liquefied ethane, propane, isobutane, n-butane, n-hexane, the various isomeric hexanes, isooctane, paraffinic mixtures of alkanes having from 8 to 9 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about −50° to about 200° C. Also included as suitable inert diluents are benzene, toluene, ethylbenzene, cumene, decalin and the like.

Mixing of the catalyst components to provide the desired catalytic reaction product is advantageously carried out under an inert atmosphere such as nitrogen, argon or other inert gas at temperatures in the range from about −100° to about 200° C., preferably from about 0° to about 100° C. The period of mixing is not considered to be critical as it is found that a sufficient catalyst composition most often occurs within about 1 minute or less. In the preparation of the catalytic reaction product, it is not necessary to separate hydrocarbon soluble components from hydrocarbon insoluble components of the reaction product.

In the polymerization process employing the aforementioned catalytic reaction product, polymerization is effected by adding a catalytic amount of the above catalyst composition to a polymerization zone containing α-olefin monomer, or vice versa. The polymerization zone is maintained at temperatures in the range from about 0° to about 300° C., preferably at solution polymerization temperatures, e.g., from about 130° to about 250° C. for a residence time of about a minute to several days, preferably 15 minutes to 2 hours. It is generally desirable to carry out the polymerization in the absence of moisture and oxygen and a catalytic amount of the catalytic reaction product is generally within the range from about 0.0001 to about 0.1 millimoles titanium per liter of diluent. It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of titanium. Generally in the polymerization process, a carrier, which may be an inert organic diluent or solvent or excess monomer, is generally employed. In order to realize the full benefit of the high efficiency catalyst of the present invention, care must be taken to avoid oversaturation of the solvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitably as defined as hereinbefore.

The polymerization pressures preferably employed are relatively low, e.g., from about 50 to about 1000 psig, especially from about 100 to about 600 psig. However, polymerization within the scope of the present invention can occur at pressures from atmospheric up to pressures determined by the capabilities of the polymerization equipment. During polymerization it is desirable to stir the polymerization recipe to obtain better temperature control and to maintain uniform polymerization mixtures and throughout the polymerization zone.

In order to optimize catalyst yields in the polymerization of ethylene, it is preferable to maintain an ethylene concentration in the solvent in the range from about 1 to about 10 weight percent, most advantageously about 1.2 to about 2 weight percent. To achieve this when an excess of ethylene is fed into the system, a portion of the ethylene can be vented.

Hydrogen is often employed in the practice of this invention to lower molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalytic reaction product in any conventional manner, preferably by bringing the catalytic reaction product and monomer together with intimate agitation provided by suitable stirring or other means. Agitation can be continued during polymerization, or in some instances, the polymerization can be allowed to remain unstirred while polymerization takes place. In the case of more rapid reactions with more active catalysts, means can be provided for refluxing monomer and solvent, if any of the latter is present and thus remove the heat of reaction. In any event adequate means should be provided for dissipating the exothermic heat of polymerization. If desired, the monomer can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent of the types conventionally employed for deactivating Ziegler catalysts. The resultant polymer is found to contain insignificant amounts of catalyst residue and to possess a very narrow molecular weight distribution.

The following examples are given to illustrate the invention, and should not be construed as limiting its scope. All parts and percentages are by weight unless otherwise indicated.

GENERAL OPERATING PROCEDURE FOR WORKING EXAMPLES

In the following examples, the catalyst preparations are carried out in the absence of oxygen or water in a nitrogen filled 120 ml serum bottle. The catalyst components are used as diluted solutions in either n-heptane or Isopar E ® (a mixture of saturated isoparaffins having 8 to 9 carbon atoms). The polymerization reactions are carried out in a five liter stainless steel stirred batch reactor at 150° C. unless otherwise stated. In such polymerization reactions two liters of dry oxygen-free Isopar E ® are added to the reactor and heated to 150° C. The reactor is vented to about 25 psig and 15 to 20 psi of hydrogen is added for polymer molecular weight control. Then, 120 psi of ethylene is added to the reactor and the ethylene pressure is set to maintain the reactor pressure at 160 psig. The catalyst is then pressured into the reactor using nitrogen and the reactor temperature is maintained for the desired polymerization time. The polymerization reactor contents are dumped into a stainless steel beaker and allowed to cool. The resulting slurry is filtered and the polymer dried and weighed. The ethylene consumption during polymerization is recorded with a DP cell which shows the rate of polymerization and the amount of polymer produced. Catalyst efficiencies are reported as grams of polyethylene per gram of titanium, g.PE/g.Ti.

EXAMPLE 1

A catalyst is prepared by adding with stirring 0.43 ml of 0.688 M di (n-butyl)magnesium. 1/6 triethylaluminum in Isopar E ® to 48.5 ml of Isopar E ®. To this solution is added 0.66 ml of titanium complex which is 0.0076 M based on Ti in Isopar E ®. This complex is prepared by heating 20 g of $\alpha$-TiCl$_3$ in 800 ml of isopropanol to a tempeature of 80° C. until a brilliant blue solution is formed. To the resultant slurry are added 0.41 ml of 0.92 M ethylaluminum dichloride in cyclohexane. A 10 ml aliquot (0.0010 mmoles Ti) of the resulting reaction product is added to the polymerization reactor. After 37 minutes, 248 grams of linear polyethylene is formed to give a catalyst efficiency of $5.7 \times 10^6$ g.PE/g.Ti.

EXAMPLE 2

A catalyst is prepared by adding 81.61 ml of Isopar E®, and 1.49 ml of 0.516 M di(n-butyl)magnesium. 2 triethylaluminum in Isopar E® to a serum bottle. To the resultant solution is added, in order, 1.9 ml of a slurry of the titanium complex described in Example 1 which is 0.0081 M with respect to Ti in Isopar E® and 15 ml of 0.113 M HCl in Isopar E®. Ten milliliters of this catalyst (0.0015 mmoles Ti) is added to the polymerization reactor and after 30 minutes the reactor contents are collected. The yield of polymer is 158 grams indicating a catalyst efficiency of $2.2 \times 10^6$ g.PE/g.Ti.

EXAMPLE 3

Following the general operating procedure described hereinbefore, several catalysts are prepared and polymerization runs are made. Unless otherwise indicated, the total catalyst concentration in the polymerization reactor is 0.001 millimolar based on Ti and the polymerization temperature is 150° C. The catalysts and the results of these polymerization runs are reported in the following Table I.

as the octadiene is increased the molecular weight distribution of the polymer is broadened and the environmental stress crack resistance of the polymer is improved.

EXAMPLE 5

Again using a catalyst prepared in accordance with Example 1, a polymerization run is carried out in accordance with the general operating procedure except that 45 g. of butene-1 is employed in 2 l. of Isopar E®. The catalyst (a portion corresponding to 0.0045 mmole of Ti) is added to the reaction vessel and after 33 minutes 303 g. of polymer is obtained indicating a catalyst efficiency of $1.4 \times 10^6$ g. of polymer/g. of Ti. The polymer has a very narrow molecular weight distribution and a low peak molecular weight. If the polymerization temperature is lowered to 80° C., a polymer having a broader molecular weight distribution and higher molecular weight is obtained with the recovered polymer exhibiting rubbery characteristics.

EXAMPLE 6

Using a catalyst prepared as in Example 1, a polymerization run is carried out in accordance with the general

TABLE I

| Run No. | Order of Addition[1] | Molar Ratios[2] | Catalyst Efficiency g . PE/g . Ti |
|---|---|---|---|
| 1 | $TiCl_3(iPrOH)_x$/DBMg · 1/6Al(Et)$_3$/EADC | 1/59/75 | $4.53 \times 10^6$ |
| 2 | EADC/$TiCl_3(iPrOH)_x$/DBMg · 1/6Al(Et)$_3$ | 75/1/59 | $3.2 \times 10^6$ |
| 3 | EADC/DBMg · 1/6Al(Et)$_3$/$TiCl_3 \cdot (iPrOH)_x$ | 75/59/1 | $4.86 \times 10^6$ |
| 4 | DBMg · 1/6Al(ET)$_3$/$TiCl_3(iPrOH)_x$/EADC | 59/1/75 | $5.17 \times 10^6$ |
| 5 | DBMg · 2Al(Et)$_3$/$TiCl_3(iPrOH)_x$/EADC | 40/1/60 | $3.8 \times 10^6$ |
| 6 | DBMg · 2Al(Et)$_3$/$TiCl_3(iPrOH)_x$/EADC | 40/1/50 | $3.76 \times 10^6$ |
| 7**(a) | DBMg · 2Al(Et)$_3$/$TiCl_3(iPrOH)_x$tBuCl | 40/1/130 | $1.03 \times 10^6$ |
| 8* | DBMg · 2Al(Et)$_3$/$TiCl_3(iPrOH)_x$/HCl | 40/1/160 | $2.29 \times 10^6$ |
| 9*** | HCl/DBMg · 2Al(Et)$_3$/$TiCl_3(iPrOH)_x$ | 200/50/1 | $1.28 \times 10^6$ |
| 10*** | HCl/DBMg · 2Al(Et)$_3$/$TiCl_3(iPrOH)_x$ | 180/50/1 | $2.82 \times 10^6$ |
| 11*** | HCl/DBMg · 2Al(Et)$_3$/$TiCl_3(iPrOH)_x$ | 160/50/1 | $1.9 \times 10^6$ |
| 12*** | HCl/DBMg · 2Al(Et)$_3$/$TiCl_3(iPrOH)_x$ | 190/50/1 | $1.87 \times 10^6$ |
| 13*** | HCl/DBMg · 2Al(Et)$_3$/$TiCl_3(iPrOH)_x$ | 190/50/1 | $1.87 \times 10^6$ |
| 14* | DBMg · 2Al(Et)$_3$/$TiCl_3(iPrOH)_x$/HCl | 60/1/216 | $2.14 \times 10^6$ |
| 15* | DBMg · 1/3Al(Et)$_3$/$TiCl_3(iPrOH)_x$/EADC | 50/1/60 | $3.0 \times 10^6$ |
| 16* | DBMg · 1/3Al(Et)$_3$/$TiCl_3(EtOH)_x$/EADC | 50/1/60 | $2.65 \times 10^6$ |
| 17* | DBMg · 1/6Al(Et)$_3$/$TiCl_3(iPrOH)_x$/EADC/ZnEt$_2$ | 59/1/75/2 | $4.55 \times 10^6$ |
| 18 | DBMg · 1/6Al(Et)$_3$/$TiCl_3(iPrOH)_x$/EADC | 40/1/60 | $1.42 \times 10^6$ |
| 19* | DBMg · 1/6Al(Et)$_3$/$TiCl_3(iPrOH)_x$/EADC | 80/1/100 | $3.4 \times 10^6$ |
| 20**** | DBMg · 1/6Al(Et)$_3$ · Zn(Et)$_3$/$TiCl_3(iPrOH)_x$/EADC | 60/1/75 | $2.33 \times 10^6$ |
| 21* | DBMg · 1/6Al(Et)$_3$/$TiCl_3(iPrOH)_x$/EADC/Ti-(OiPr)$_4$ | 60/ · 5/75/ · 5 | $3.27 \times 10^6$ |

*catalyst concentration of 0.0015 millimolar based on Ti
**catalyst concentration of 0.0025 millimolar based on Ti
***catalyst concentration of 0.0017 millimolar based on Ti
****catalyst concentration of 0.003 millimolar based on Ti
(a)Polymerization temperature of 180° C.
[1]DBMg · 1/6Al(Et)$_3$-di(n-butyl)magnesium · 1/6 aluminum triethyl
DBMg · 2Al(ET)$_3$-di(n-butyl)magnesium · 2 aluminum triethyl
DBMg-1/3 Al(Et)$_3$-di(n-butyl)magnesium · 1/3 aluminum triethyl
$TiCl_3(iPrOH)_x$-complex of titanium trichloride and isopropyl alcohol, x = ~3
$TiCl_3(EtOH)_x$ complex of titanium trichloride and ethyl alcohol, x = ~3
Ti(OiPr)$_4$-tetra(isopropoxy)titanium
t-BuCl-t-butyl chloride
EADC-ethyl aluminum dichloride
[2]Molar ratios of catalyst components as listed in Order of Addition.

EXAMPLE 4

Using a catalyst prepared in accordance with Example 1 and having a Mg/Ti/Al atomic ratio of 60/1/75, a polymerization run is carried out generally according to the general operating procedure except that varying amounts of 1,7-octadiene are substituted for a part of the solvent and 150 psig ethylene is employed in the absence of hydrogen.

As the octadiene is increased from 0.1 to 20.0 ml. in 2 l. of solvent, the catalyst efficiency decreases from $2.32 \times 10^6$ to $0.38 \times 10^6$ g. of polymer per g. of Ti. Also operating procedure except that 100 psig of propylene is introduced into the reactor followed by an introduction of 200 psig of ethylene and polymerization is effected at 75° C. After 50 minutes, 188 g. of rubbery ethylene/propylene copolymer is obtained indicating a catalyst efficiency of $0.44 \times 10^6$ g. of copolymer per g. of Ti.

If the propylene pressure is reduced to 120 psig, the ethylene pressure is reduced to 162 psig and polymerization carried out at 100° C., the catalyst efficiency is 0.47×10⁶ g. of copolymer/g. of Ti and the resulting copolymer is very tough and has good clarity.

EXAMPLE 7

Using a catalyst prepared as in Example 1, a polymerization run is carried out in accordance with the general operating procedure except that 50 ml of 1-hexane is introduced into the reactor followed by an introduction of 160 psig of ethylene and polymerization is effected at 150° C. After 30 minutes, 165 g. of ethylene/1-hexene copolymer is obtained indicating a catalyst efficiency of $1.5 \times 10^6$ g. of copolymer per g. of Ti.

EXAMPLE 8

Using a catalyst prepared as in Example 1, a polymerization run is carried out in accordance with the general operating procedure except that 50 ml of 1-octene is introduced into the reactor followed by an introduction of 160 psig of ethylene and polymerization is effected at 150° C. After 30 minutes, 150 g. of ethylene/1-octene copolymer is obtained indicating a catalyst efficiency of $1.4 \times 10^6$ g. of copolymer per g. of Ti.

What is claimed is:

1. A process for the polymerization of an α-olefin under the conditions characteristic of Ziegler polymerization wherein a catalytic reaction product of (A) a complex of a trivalent titanium halide with water or an organic electron donor selected from alcohols having 2–8 carbon atoms, ethers having 2 to 20 carbon atoms, ketones having 3–20 carbon atoms, amines having 1–20 carbon atoms, olefins having 2–20 carbon atoms and mixtures thereof, (B) an organomagnesium component selected from (1) an organomagnesium compound or (2) a complex of an organomagnesium compound and an organometallic compound in an amount sufficient to solubilize the organomagnesium compound in hydrocarbon, said organomagnesium compound and said complex being represented respectively by the following formulas $$MgR_2 \text{ and } MgR_2 \cdot x \, MR_y$$

wherein each R is independently a hydrocarbyl group having from 1 to 8 carbon atoms, M is a metal selected from Al, Zn, Si, Sn and P, y is the number of hydrocarbyl groups and corresponds to the valencey of M and x is about 0.001 to 10 and (C) a halide source selected from (1) an active non-metallic halide, said non-metallic halide corresponding to the formula R'X wherein R' is hydrogen or an organic group at least as active as sec-butyl and does not poison the catalyst and X is halogen or (2) a metallic halide corresponding to the formula $MR_{y-a}X_a$ wherein M is a metal of Group 3a or 4a of Mendeleev's Periodic Table of Elements, R is a monovalent organic radical, X is halogen, y is a number corresponding to the valence of M and a is a number from 1 to y; provided that the proportions of the foregoing components of said catalytic reaction product being such that the atomic ratio of Mg:Ti is within the range which is from about 1:1 to about 2000:1, either B, C or a mixture thereof contains aluminum or an aluminum trialkyl or an aluminum alkyl halide is added separately such that the atomic ratio of Al:Ti is within the range from about 0.1:1 to about 2000:1, the atomic ratio of Mg:X is within the range from about 0.01:1 to about 1:1 is employed as a polymerization catalyst.

2. The process of claim 1 wherein the organomagnesium compound is a dihydrocarbyl magnesium.

3. The process of claim 1 wherein the organomagnesium component is a complex of dialkyl magnesium and a trialkyl aluminum wherein the atomic ratio of Mg to Al in the organomagnesium component is within the range from about 0.3:1 to about 1000:1.

4. The process of claim 3 wherein the atomic ratio of Mg:Ti is from about 20:1 to about 80:1, the atomic ratio of Mg:X is from about 0.2:1 to about 0.7:1 and the atomic ratio of Mg to Al is from about 0.5:1 to about 10:1 for the total catalytic reaction product.

5. The process of claim 1 wherein the complex is represented by the empirical formula $TiZ_3(L)_x$ wherein Z is halide, L is selected from water, alcohols having 2–8 carbon atoms, ethers having 2 to 20 carbon atoms, ketones having 3–20 carbon atoms, amines having 1–20 carbon atoms, olefins having 2–20 carbon atoms and mixtures thereof and x is a whole number from 1 to 6; the organomagnesium compound is dihydrocarbyl magnesium; the organometallic compound is an aluminum trihydrocarbyl; the non-metallic halide is hydrogen halide or hydrocarbyl halide, said hydrocarbyl groups having 1 to 8 carbon atoms; the metallic halide is an aluminum halide corresponding to the formula $AlR_{3-a}X_a$ wherein R is alkyl, X is halogen, and a is a number from 1 to 3; the Mg:Ti ratio is from about 20:1 to about 80:1, the Mg:X ratio is from about 0.4:1 to about 0.6:1 and Mg:Al ratio in the total catalytic product is from about 0.5:1 to about 10:1.

6. The process of claim 5 wherein the complex is a complex of titanium trichloride and an alcohol having from 3 to 6 carbon atoms, the dihydrocarbyl magnesium is dialkyl magnesium, the aluminum trihydrocarbyl is aluminum trialkyl, the non-metallic halide is hydrogen chloride or t-alkyl chloride; and the aluminum halide is an alkyl aluminum chloride.

7. The process of claim 6 wherein the complex is a complex of titanium trichloride and isopropyl alcohol and x is 2 to 4 and the dialkyl magnesium is dibutylmagnesium.

8. The process of claims 8, 10, 11, 12, 13, or 14 wherein the α-olefin is ethylene or a mixture of ethylene and a higher α-olefin.

* * * * *